United States Patent
Tang et al.

(10) Patent No.: US 8,707,232 B2
(45) Date of Patent: Apr. 22, 2014

(54) FAULT DIAGNOSIS BASED ON DESIGN PARTITIONING

(75) Inventors: Huaxing Tang, Wilsonville, OR (US); Wu-Tung J. Cheng, Lake Oswego, OR (US); Robert Brady Benware, Clackamas, OR (US); Xiaoxin Fan, Wilsonville, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/492,763

(22) Filed: Jun. 8, 2012

(65) Prior Publication Data
US 2013/0024830 A1 Jan. 24, 2013

Related U.S. Application Data

(60) Provisional application No. 61/494,815, filed on Jun. 8, 2011, provisional application No. 61/500,212, filed on Jun. 23, 2011.

(51) Int. Cl.
| | |
|---|---|
| *G06F 17/50* | (2006.01) |
| *G06F 11/00* | (2006.01) |
| *G01R 31/00* | (2006.01) |
| *G06F 11/26* | (2006.01) |
| *G06F 11/263* | (2006.01) |
| *G01R 31/28* | (2006.01) |

(52) U.S. Cl.
CPC .......... *G06F 17/5022* (2013.01); *G06F 17/505* (2013.01); *G06F 11/261* (2013.01); *G06F 11/263* (2013.01); *G01R 31/2803* (2013.01); *G01R 31/2846* (2013.01)
USPC ........... 716/112; 716/104; 716/106; 716/136; 703/16; 703/20; 702/59; 702/118; 714/32; 714/732; 714/741

(58) Field of Classification Search
CPC . G06F 17/5022; G06F 17/505; G06F 11/261; G06F 11/263; G01R 31/2803; G01R 31/2846
USPC .............. 716/112, 104, 106, 136; 703/16, 20; 702/59, 118; 714/32, 732, 741
See application file for complete search history.

(56) References Cited

U.S. PATENT DOCUMENTS 4,882,690 A * 11/1989 Shinsha et al. ................. 716/104
5,309,447 A * 5/1994 Moskowitz et al. ........... 714/732
(Continued)

FOREIGN PATENT DOCUMENTS

JP 2001308150 A * 11/2001 .............. H01L 21/66

OTHER PUBLICATIONS

B.W. Kernighan et al., "An Efficient Heuristic Procedure for Partitioning Graphs," Bell Syst. Tech. J., vol. 49, No. 2, 291-307, 1970.

(Continued)

*Primary Examiner* — Phallaka Kik
(74) *Attorney, Agent, or Firm* — Klarquist Sparkman, LLP

(57) ABSTRACT

Aspects of the invention relate to techniques for fault diagnosis based on circuit design partitioning. According to various implementations of the invention, a circuit design of a failing die is first partitioned into a plurality of sub-circuits. The sub-circuits may be formed based on fan-in cones of observation points. Shared gate ratios may be used as a metric for adding fan-in cones of observation points into a sub-circuit. Based on test patterns and the sub-circuits, sub-circuit test patterns are determined. Fault diagnosis is then performed on the sub-circuits. The sub-circuit fault diagnosis comprises extracting sub-circuit failure information from the failure information for the failing die. The sub-circuit fault diagnosis may employ fault-free values for boundary gates in the sub-circuits.

20 Claims, 6 Drawing Sheets

(56) References Cited

U.S. PATENT DOCUMENTS

| | | | | |
|---|---|---|---|---|
| 5,457,697 | A | * | 10/1995 | Malleo-Roach et al. ..... 714/726 |
| 5,544,173 | A | * | 8/1996 | Meltzer .................. 714/726 |
| 5,638,380 | A | * | 6/1997 | De ........................ 714/726 |
| 5,684,808 | A | * | 11/1997 | Valind ................... 714/726 |
| 5,737,340 | A | * | 4/1998 | Tamarapalli et al. ...... 714/733 |
| 5,862,149 | A | * | 1/1999 | Carpenter et al. ......... 714/726 |
| 6,070,261 | A | * | 5/2000 | Tamarapalli et al. ...... 714/733 |
| 8,433,990 | B2 | * | 4/2013 | Matsumoto ............... 714/817 |
| 8,516,400 | B2 | * | 8/2013 | Kuo et al. ................ 716/51 |
| 2003/0217315 | A1 | * | 11/2003 | Maamari et al. ........... 714/741 |
| 2007/0136700 | A1 | * | 6/2007 | Wang et al. .............. 716/4 |
| 2008/0201670 | A1 | * | 8/2008 | Rinderknecht et al. ...... 716/4 |
| 2012/0221284 | A1 | * | 8/2012 | Sinanoglu ................ 702/119 |

OTHER PUBLICATIONS

George Karypis et al., "Multilevel Hypergraph Partitioning: Applications in VLSI Domain," IEEE Transactions on Very Large Scale Integration Systems, vol. 7, No. 1, 69-79, 1999.

L. M. Huisman, M. Kassab, and L. Pastel, "Data Mining Integrated Circuit Fails with Fail Commonalities," in Proceedings of International Test Conference, pp. 661-668, 2004.

M. Keim, P. Muhmenthaler, H. Tang, M. Sharma, J. Rajski, C. Schuermyer, and B. Benware, "A Rapid Yield Learning Flow Based on Production Integrated Layout-Aware Diagnosis," In Proceedings of International Test Conference, pp. 1-10, 2006.

H. Tang, S. Manish, J. Rajski, M. Keim, and B. Benware, "Analyzing Volume Diagnosis Results with Statistical Learning for Yield Improvement," In Proceedings of European Test Symposium, 2007, 6 pages.

M. Sharma, C. Schuermyer, and B. Benware, "Determination of Dominant-Yield-Loss Mechanism with Volume Diagnosis," in Proceedings IEEE Design & Test of Computers, vol. 27, No. 3, pp. 54-61, 2010.

W.C. Tam, O. Poku, and R.D. Blanton, "Systematic Defect Identification Through Layout Snippet Clustering," in Proceedings of IEEE International Test Conference, 2010, pp. 1-11.

A. Leininger, P. Muhmenthaler, W.-T. Cheng, N. Tamarapalli, W. Yang, and H. Tsai, "Compression Mode Diagnosis Enables High Volume Monitoring Diagnosis Flow," in Proceedings of International Test Conference, 2005, pp. 1-10.

B. Chess and T. Larrabee, "Creating Small Fault Dictionaries," IEEE Transactions on Computer-Aided Design of Integrated Circuits, vol. 18, No. 3, 346-356, 1999.

I. Pomeranz and S. M. Reddy, "On the Generation of Small Dictionaries for Fault Location", In Proceedings of International Conference on Computer-Aided Design, pp. 272-279, 1992.

C. Liu, W.-T. Cheng, H. Tang, S.M. Reddy, W. Zou, and M. Sharma, "Hyperactive Faults Dictionary to Increase Diagnosis Throughput," in Proceedings of Asian Test Symposium, 2008, pp. 173-178.

S. Wang and W. Wei, "Machine Learning-based Volume Diagnosis," in Proceedings of Design, Automation * Test in Europe Conference Exhibition, 2009, 4 pages.

H. Li, D. Xu, Y. Han, K.-T. Cheng, and X. Li, "nGFSIM: A GPU-based Fault Simulator for 1-to-n Detection and Its Applications", in Proceedings of International Test Conference, 2010, pp. 1-10.

Charles J. Alpert and Andrew B. Kahng, "Recent Directions in Netlist Partitioning," Integration, the VLSI Journal, vol. 19, No. 1-2, pp. 1-81, 1995.

J. Cong, W. Juan Labio, and N. Shivakumar, "Multiway VLSI Circuit Partitioning Based on Dual Net Representation," in Proceedings of IEEE Transactions on Computer-Aided Design of Integrated Circuits and Systems, vol. 15, No. 4, 1996, pp. 396-409.

D. Kolar, J.D. Puksee, and I. Branica, "VLSI Circuit Partition Using Simulated Annealing Algorithm," in Proceedings of IEEE Mediterranean Electrotechnical Conference, pp. 205, 2004.

C.M. Fidducia, and R.M. Mattheyses, "A Linear-Time Heuristic for Improving Network Partitions," in Proceedings of Conference on Design Automation, 1982, pp. 175-181.

S. Areibi, and A. Vannelli, "An Efficient Clustering Technique for Circuit Partitioning," in Proceedings of IEEE International Symposium on Circuits and Systems, 1996, pp. 671-674.

I. Pomeranz and S.M. Reddy, "Location of Stuck-at-Faults and Bridging Faults Based on Circuit Partitioning," in Proceedings of IEEE Transactions on Computers, vol. 47, No. 10, 1998, pp. 1124-1135.

J. Waicukauski and E. Lindbloom, "Failure Diagnosis of Structured VLSI," IEEE Design & Test of Computer, vol. 6, No. 4, pp. 49-60, 1989.

J. Ye, Y. Hu, and X. Li, "Diagnosis of multiple arbitrary faults with mask and reinforcement effect," In Proceedings of Design, Automation & Test in Europe Conference, 2010, 6 pages.

* cited by examiner

FAULT DIAGNOSIS BASED ON DESIGN PARTITIONING

RELATED APPLICATIONS

This application claims priority to U.S. Provisional Patent Application No. 61/494,815, entitled "Design Partitioning For Diagnosis," filed on Jun. 8, 2011, and naming Huaxing Tang et al. as inventors, and U.S. Provisional Patent Application No. 61/500,212, entitled "Design Partitioning For Diagnosis," filed on Jun. 23, 2011, and naming Huaxing Tang et al. as inventors, both of which applications are incorporated entirely herein by reference.

FIELD OF THE INVENTION

The present invention relates to the field of integrated circuit (IC) testing technology. Various implementations of the invention may be particularly useful for fault diagnosis.

BACKGROUND OF THE INVENTION

Quick yield ramp-up is critical for IC manufacturing. During a yield ramp-up process, systematic yield limiters are usually identified using yield learning methods. As the circuit feature size continuously shrinks and the design complexity continuously increases, however, traditional yield learning methods such as inline inspection, memory bitmapping and test chips are becoming less effective. Statistical yield learning methods based on volume diagnosis have recently been developed. Diagnosis results for a large number of failing devices contain valuable defect information including types, locations, physical topology, and design features. With the employment of various statistical methods, systematic issues and/or dominant defect mechanisms may be extracted from these diagnosis results.

For practical applications, a yield learning method based on volume diagnosis should be able to use reasonable computational resources to process a large number of failing dies within a short period of time. While the performance of diagnosis algorithms have been improved by various techniques including pattern sampling, fault dictionary, and machine learning, diagnosing of large circuit designs still requires a large amount of memory.

Even though the number of processors in modern workstations has increased significantly, the amount of physical memory does not increase as fast. A conventional diagnosis tool may require up to hundreds of gigabytes of memory for a design with hundreds of millions of gates. For current workstations with the largest memory and tens of processors, the number of concurrently running diagnosis programs is still very limited because only a few diagnosis programs will use up all the memory. As a result, most of the processors will stay idle. The low efficiency of resource utilization, in addition to the increasing processor time for each failing die, presents a serious challenge to diagnosis throughput and thus to practical applications of the yield learning methods based on volume diagnosis.

BRIEF SUMMARY OF THE INVENTION

Aspects of the invention relate to techniques for fault diagnosis based on circuit design partitioning. According to various implementations of the invention, a circuit design for a failing die is first partitioned into a plurality of sub-circuits. The sub-circuits may be formed based on fan-in-cones of observation points. In some embodiments of the invention, an unused observation point with a small fan-in cone may be selected as an initial fan-in cone to be placed in a sub-circuit. Shared gate ratios between the fan-in cones may be used as a metric for adding fan-in cones of observation points into the sub-circuit. Because the memory usage and run time needed for a sub-circuit is proportional to the size of the sub-circuit, the plurality of sub-circuits may have a similar size with some implementations of the invention.

Based on test patterns and the plurality of sub-circuits, sub-circuit test patterns for the plurality of sub-circuits are determined. The determination of sub-circuit test patterns may comprise mapping the test patterns to the plurality of sub-circuits. The determination of sub-circuit test patterns may further comprise performing good machine simulation for the test patterns to determine fault-free values for boundary gates in the plurality of sub-circuits.

Next, fault diagnosis may is performed on the plurality of sub-circuits based on the sub-circuit test patterns and failure information for the dialing die to generate sub-circuit diagnosis data. During the operation, sub-circuit failure information for the plurality of sub-circuits may first be extracted from the failure information. Then fault diagnosis is performed on sub-circuits that have one or more failing bits based on the sub-circuit failure information and the sub-circuit test patterns. The fault-free values for boundary gates in the plurality of sub-circuits may be employed.

Finally, diagnosis data for the die is generated based on the sub-circuit diagnosis data and outputted. If only one sub-circuit has failing bits, the sub-circuit diagnosis data for this sub-circuit may be used directly as the diagnosis data. The output operation may comprise storing the diagnosis data in computer memory or storage.

DETAILED DESCRIPTION OF THE INVENTION

General Considerations

Various aspects of the present invention relate to fault diagnosis techniques based on design partitioning. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine," "partition," and "generate" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

Figure 1:
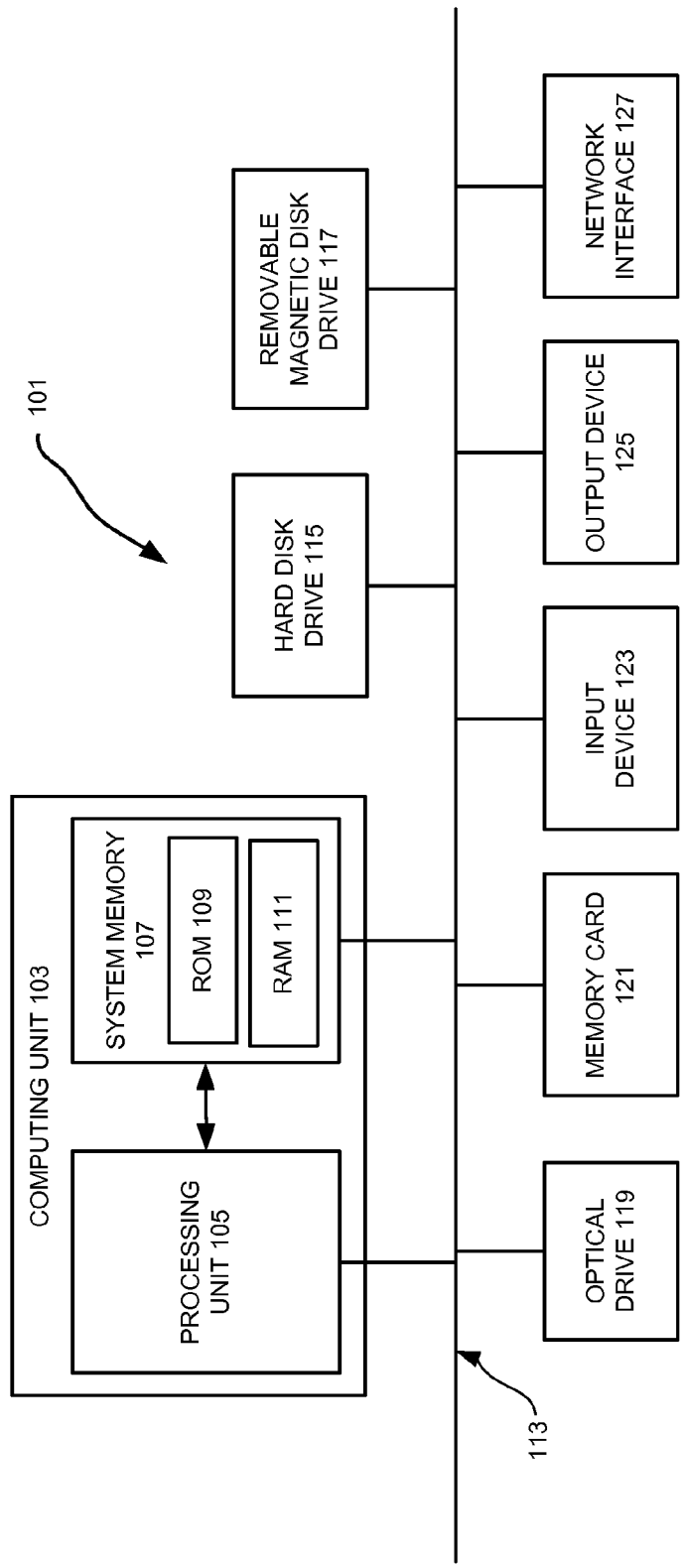
FIG. 1 illustrates a programmable computer system with which various embodiments of the invention may be employed.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Partitioning-Based Diagnosis and Diagnosis Accuracy and Resolution

Most of the diagnosis methods fall into two categories: cause-effect analysis and effect-cause analysis. In the cause-effect analysis, fault simulation is performed to build a fault dictionary. During a diagnosis process, the fault dictionary is checked to find a set of suspects that best match the test results observed on the tester. The size of a complete fault dictionary is proportional to O(F·T·O) where F is the number of faults, T is the number of test patterns and O is the number of outputs. For design with millions of gates, a large amount of storage space is needed.

Figure 2:
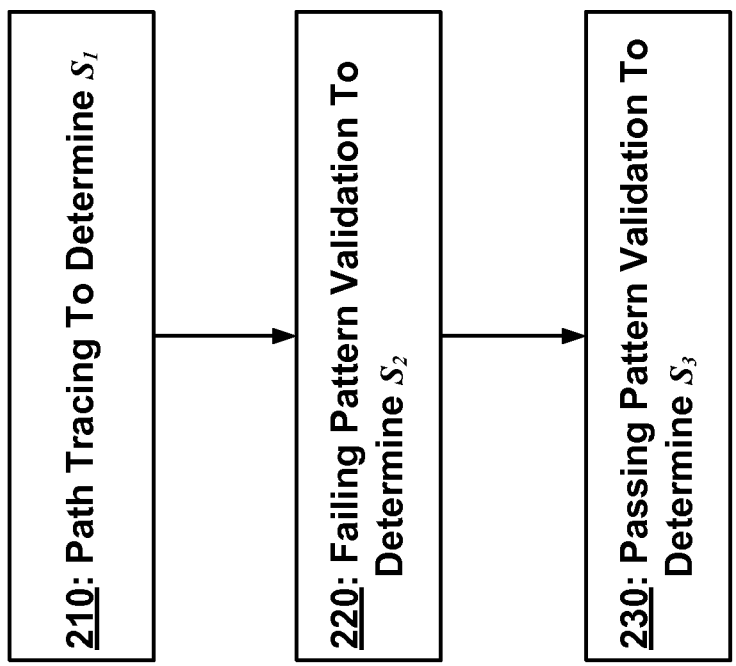
FIG. 2 illustrates an example of an effect-cause diagnosis process.

By contrast, the effect-cause analysis directly examines the failure information and identifies suspects through fault simulation. An example of an effect-cause diagnosis process is illustrated in FIG. 2. It starts with path-tracing operation 210 which identifies an initial set of fault candidates $S_1$ based on failing bits. Here, failing (passing) observation points observed on the tester or in fault simulation are referred to as failing (passing) bits (of a test pattern or test set). An observation point can be a scan cell or a primary output. Based on path-tracing from a failing bit, a fan-in cone for the failing bit may be identified. Devices and connections within the fan-in cone may be included in the initial set of fault candidates $S_1$. If just one fault/defect is assumed to exist, the initial set of fault candidates $S_1$ may be limited to the intersection of fan-in cones for all of the failing bits.

In failing pattern validation operation 220, the initial set of fault candidates $S_1$ can be pruned by validation with the failing test patterns. An initial fault candidate is injected and simulated to determine whether it is a valid fault suspect. A fault candidate may be added to a set of fault suspects $S_2$ if the simulated result matches the observed failing bits. The size of the set of fault suspects $S_2$ is usually much smaller than that of the initial set of fault candidates $S_1$.

In passing pattern validation operation 230, the size of the set of fault suspects $S_2$ may be further reduced by determining whether the simulated results conflict with the observed passing bits for each passing test pattern of the failing die. If a fault suspect in $S_2$ fails during the passing pattern validation operation 230, it is less likely to be the real defect and thus may be assigned a low score or completely discarded. The final diagnosis report may comprise a set of final fault suspects $S_3$, ranked based on their scores.

As the above process indicated, the majority of the processor time and the memory usage are spent on the circuit simulation including good-circuit simulation for path-tracing and faulty-circuit simulation for failing and passing pattern validation. With the growing size of the design, both the processor time and the memory usage for circuit simulation grow proportionally.

With various implementations of the invention, these problems may be solved by first dividing a large design into many smaller blocks (sub-circuits) and then performing diagnosis on the smaller sub-circuits. For example, a design with n nodes, $V=\{v_1, v_2, v_3, \ldots, v_n\}$ where $v_i$ is a design node (gate), may be partitioned into N disjoint sub-circuits $\{B_1, \ldots, B_N\}$ of roughly equal size (about n/N nodes). The fault simulation on individual sub-circuits requires much less memory and runs faster than that on the whole circuit.

It should be appreciated that the disclosed fault diagnosis techniques do not require sub-circuits to be disjointed. In fact, shared logic may be employed to reduce loss of simulation information if the throughput is not severely affected. It should also be appreciated that the disclosed fault diagnosis techniques do not require sub-circuits to be of similar sizes even though it may help with memory usage reduction.

Figure 3:
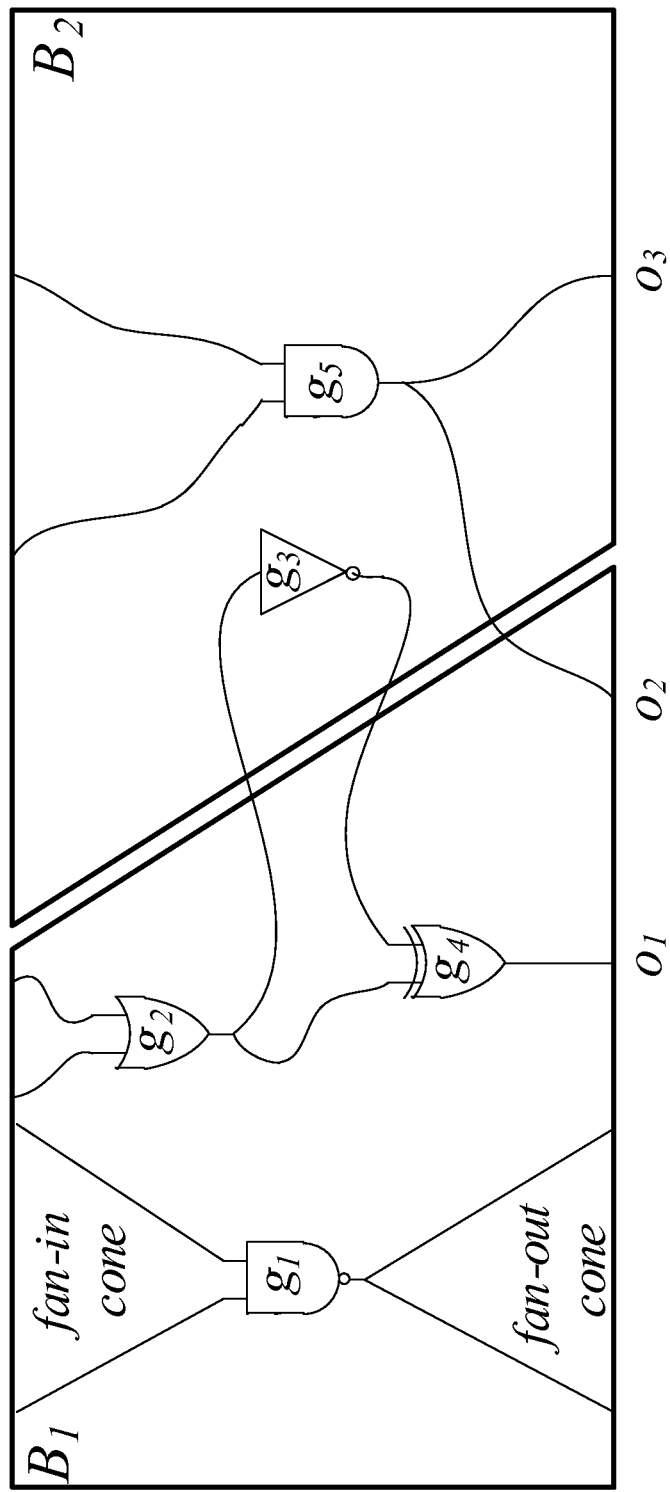
FIG. 3 illustrates an example of design partitioning and its impact.

Because the fault simulation is performed on sub-circuits, it is important to evaluate the impact of partitioning on diagnosis results of partitioning-based diagnosis methods. FIG. 3 illustrates an example of design partitioning. In the figure, the original design is partitioned into two sub-circuits, $B_1$ and $B_2$. The fan-in and fan-out cones for gate $g_1$ are within $B_1$. If a fault in $g_1$ is simulated, identical output responses may be obtained no matter whether the original design or the sub-circuit $B_1$ is used for fault simulation, i.e., there is no information loss due to partitioning.

However, some interconnections in the original netlist have to be cut as a result of partitioning. In FIG. 3, the interconnections between gate $g_2$ and gate $g_3$, between gate $g_4$ and gate $g_3$, and between observation point $o_2$ and gate $g_5$, are severed. Gates $g_4$ and $g_3$ are referred to as boundary gates because they are driven by at least one gate in a different sub-circuit. The output of a boundary gate may be unknown if the signals from gates in other sub-circuits are unknown. When simulating a gate with at least one boundary gate in its fan-in or fan-out cones, activation and/or propagation of a fault associated with the gate may not be successful due to the unknowns caused by the boundary gate. For example, one of the inputs for the boundary gate $g_4$ in FIG. 3 is unknown because gate $g_3$ is assigned to sub-circuit $B_2$. Because $g_4$ is an exclusive OR gate, the output of $g_4$ becomes unknown even if the output value of $g_2$ which drives the other input of $g_4$ is known.

This problem may be solved by assigning values obtained from simulation of fault-free circuit (good machine simulation) to the driving gates of the boundary gates. First, good machine simulation may be performed for all test patterns, and the values on the inputs of the boundary gates for each test pattern are stored. Next, when simulating a sub-circuit, the stored good simulation values for the driving gates of its boundary gates are used. Because the inputs of the boundary gates become fully specified, the unknown signals introduced by design partitioning may be eliminated.

The diagnosis result may also be affected if the fault propagation leads to an observation point assigned to a different sub-circuit. For example, gate $g_5$ in FIG. 3 can reach two observation points, $o_2$ and $o_3$. After partitioning, it is impossible to observe failure at $o_2$ for any fault at $g_5$ because $o_2$ is not visible when simulating $B_2$. This may cause missing failing bits for a fault, compared to simulating the original design.

Such missing failing bits for a fault will affect matching test results of the targeted failing device. In order to address this issue, the diagnosis algorithm may be enhanced to tolerate such missing information. In addition, design partitioning may be carefully design to minimize the average information loss for every fault.

In addition to missing failing bits, partitioning may produce extra failing bits. In FIG. 3, gate $g_2$ in sub-circuit $B_1$ has two paths re-converging at gate $g_4$. In the original circuit, a fault effect at the output of gate $g_2$ can propagate through these two paths, and the fault effects may cancel each other at $g_4$ and no fault effect is observed at $o_1$. However, when simulating $B_1$ after partitioning with a fault-free value assigned to the boundary gate $g_3$, the fault effect can propagate through $g_4$ and be incorrectly observed at $o_1$. This effect is called fault effect loopback. Such extra failing bits can potentially lead the diagnosis algorithm into producing inaccurate results. Fortunately, it is observed that the occurrence probability for this effect is very low. Also it may be eliminated by carefully crafted partitioning procedures. The detailed partitioning procedure is discussed in the next section.

Extra failing bits and missing failing bits may also occur in any partition if multiple faults are activated by a test pattern. For example, fault masking in the complete design may not occur in the partitioned design, leading to extra failing bits.

Accuracy and resolution are two common metrics for a diagnosis tool. The accuracy may be measured by a ratio of the number of reported fault/defect candidates (suspects) that are real faults/defects to the number of real faults/defects. The resolution may be represented by the average number of reported fault/defect candidates per real defect. The impact on accuracy may be calculated as (acc_orig−acc_dp)/acc_orig, where acc_orig is the diagnosis accuracy based on the original design and acc_dp is the accuracy based on partitioning. Similarly the impact on resolution can be computed as (res_dp−res_orig)/res_orig, where res_orig is the resolution for using original design and res_dp is the resolution for using partition. As such, for both accuracy and resolution impact metrics, a larger number indicates a worse result.

Experimental results regarding the accuracy and the resolution of some partitioning-based diagnosis tools implemented according to some embodiments of the present invention, have been published in an article by Xiaoxin Fan et al., "On Using Design Partitioning To Reduce Diagnosis Memory Footprint," 2011 Asian Test Symposium, pages 219-225, which is incorporated herein by reference. The results show the impact of partitioning on the accuracy and the resolution was not significant.

Fault Diagnosis Tools and Methods

Figure 4:
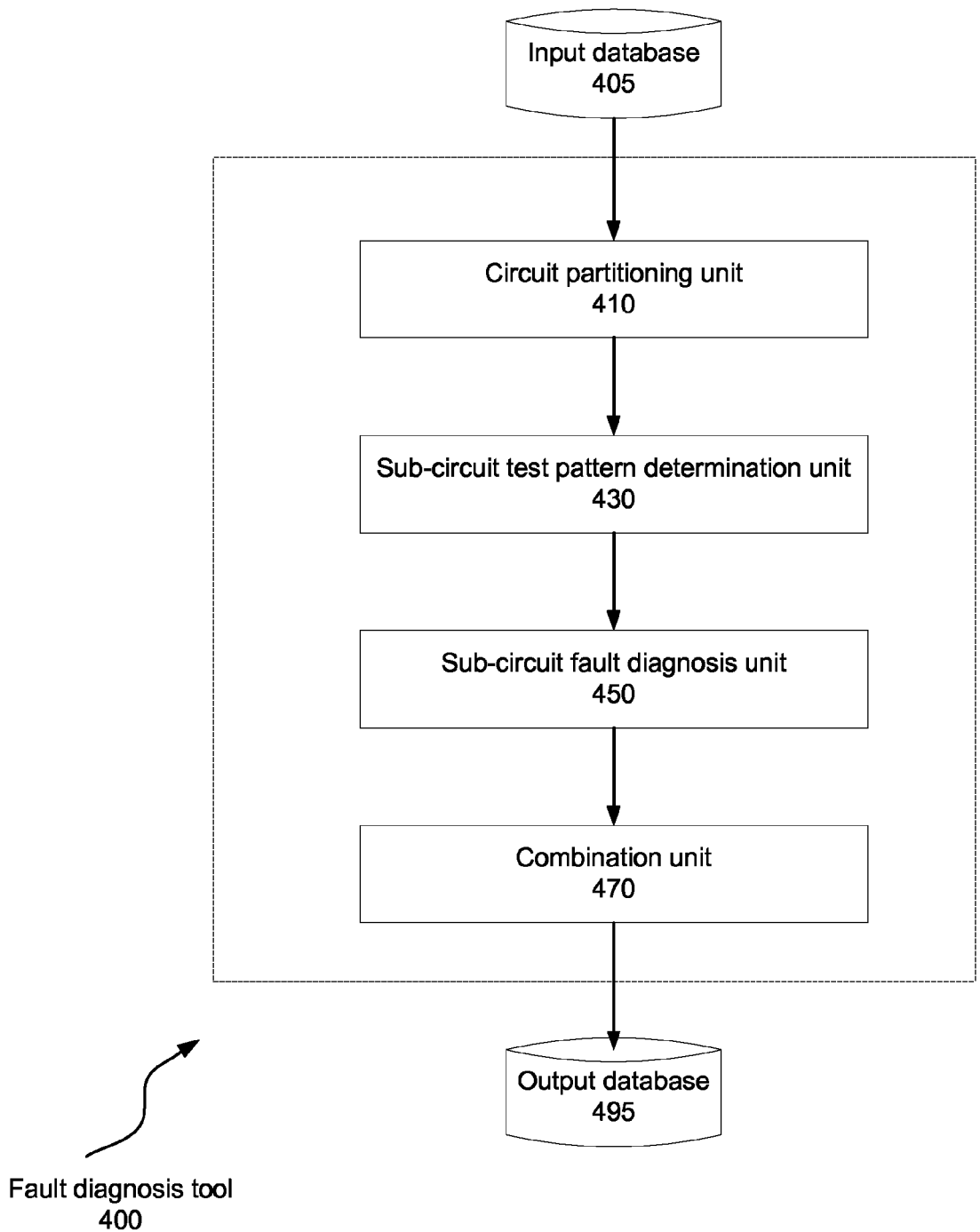
FIG. 4 an example of a fault diagnosis tool according to various embodiments of the invention.

FIG. 4 illustrates an example of a fault diagnosis tool according to various embodiments of the invention. As seen in the figure, the fault diagnosis tool 400 includes four units: a circuit partitioning unit 410, a sub-circuit test pattern determination unit 430, a sub-circuit fault diagnosis unit 450, and a combination unit 470. As will be discussed in more detail below, some implementations of the fault diagnosis tool 400 may cooperate with (or incorporate) one or both of an input database 405 and an output database 495. While the input database 405 and the output database 495 are shown as separate units in FIG. 4, a single data storage medium may be used to implement some or all of these databases.

According to some embodiments of the invention, one or more of the circuit partitioning unit 410, the sub-circuit test pattern determination unit 430, the sub-circuit fault diagnosis unit 450, and the combination unit 470 may be implemented by executing programming instructions on one or more programmable computers/computer systems, such as the computing system illustrated in FIG. 1. Correspondingly, some other embodiments of the invention may be implemented by software instructions, stored on a non-transitory computer-readable medium, for instructing one or more programmable computers/computer systems to perform the functions of one or more of the circuit partitioning unit 410, the sub-circuit test pattern determination unit 430, the sub-circuit fault diagnosis unit 450, and the combination unit 470. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

Figure 5:
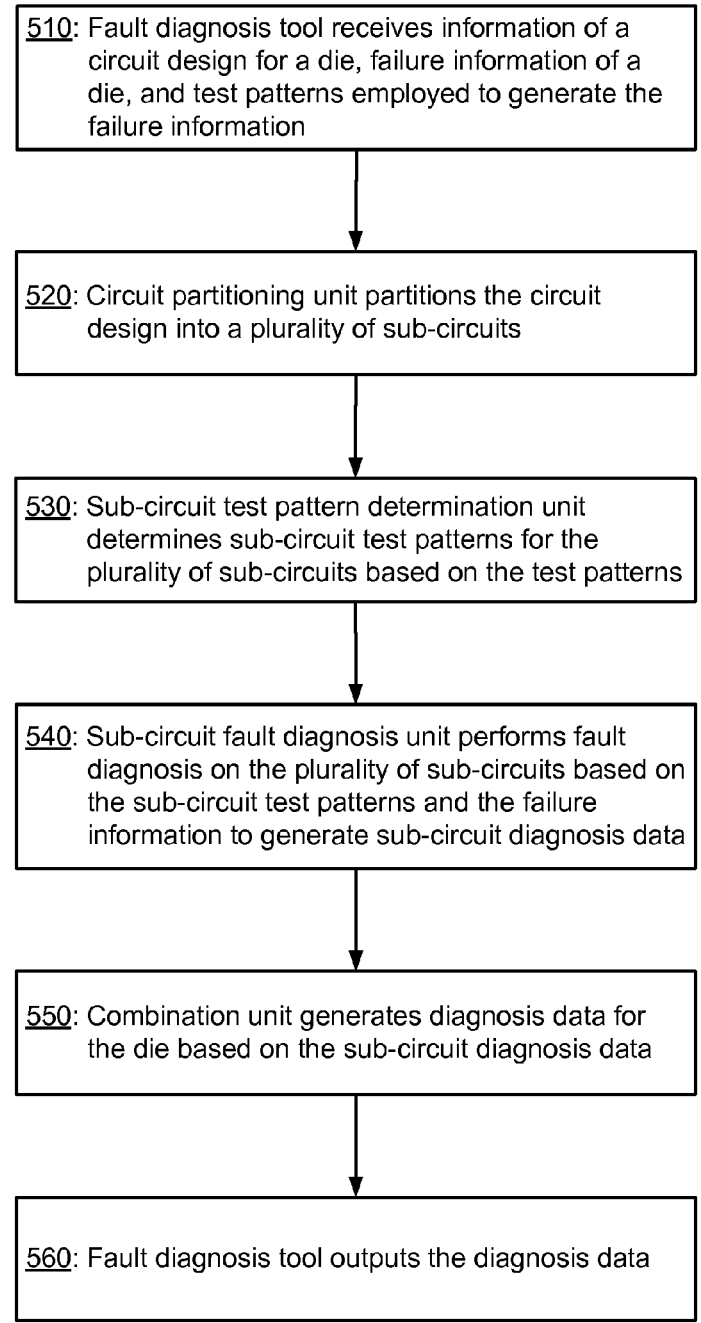
FIG. 5 illustrates a flowchart describing methods for fault diagnosis that may be employed by various embodiments of the invention.

For ease of understanding, fault diagnosis methods that may be employed according to various embodiments of the invention will be described with reference to the fault diagnosis tool 400 illustrated in FIG. 4 and the flow chart 500 in FIG. 5. It should be appreciated, however, that alternate implementations of a fault diagnosis tool may be used to perform the fault diagnosis method shown in the flow chart 500 according to various embodiments of the invention. In addition, it should be appreciated that implementations of the fault diagnosis tool 400 may be employed with other fault diagnosis methods according to different embodiments of the invention.

Initially, in operation 510, the fault diagnosis tool 400 receives information of a circuit design for a die, failure information of the die, and test patterns employed to generate the failure information. The information of a circuit design may comprise a netlist for the circuit design. The failure information may be obtained using automatic test equipment (a conventional tester). Typically, the automatic test equipment loads the test patterns into the circuit on the die and captures corresponding circuit responses (test responses). The test responses may be compared with good machine values to generate the failure information.

Next, in operation 520, the circuit partitioning unit 410 partitions the circuit design into a plurality of sub-circuits. With various implementations of the invention, the circuit partitioning unit 410 may partition the circuit design based on fan-in cones for observation points. If the fan-in cone for an observation point can be placed as a whole in a sub-circuit, the number of circuit paths related to the observation point being cut by the partitioning will be fewer. In many cases, however, portions of fan-in cones for some observation points may have to be placed in different sub-circuits due to overlaps and/or the limitations of the size for a sub-circuit.

A metric called shared gate ratio (SGR) may be employed to assist in partitioning. The SGR measures compatibility between two regions in a design such as fan-in cones for two observation points. Let C be the intersection of regions A and B. The SGR for A with B may be derived by SGR(A,B)=|C|/|A|, where |C|(|A|) is the number of gates in C(A). Similarly, the SGR for B with A is SGR(B, A)=|C|/|B|. The following shows a detailed process of design partitioning according to some embodiments of the invention:

| Design Partitioning Algorithm |
|---|
| 0: Initially, each block $B_i$ is empty for i = 1 ... N |
| 1: For a block $B_i$ where i = 1 ... N |
| 2:   While $B_i$ does not exceed the size limit |
| 3:     If $B_i$ is empty |

| Design Partitioning Algorithm |
|---|
|       Choose an unselected observation point $O_j$ with smallest fan-in cone $C_j$ |
|       Add all the unselected gates in the fan-in cone $C_j$ into $B_i$ |
|       Mark $O_j$ as selected, and mark the gates in $C_j$ as selected |
| 4:   Else |
|       Choose an unselected observation point $O_j$ with maximal SGR($C_j$, $B_i$) where $C_j$ is the fan-in cone of $O_j$, or $O_j$ with smallest fan-in cone if the maximal SGR is 0 |
|       Add all the unselected gates in the fan-in cone $C_j$ into $B_i$ |
|       Mark $O_j$ as selected, and mark the gates in $C_j$ as selected |
| 5:   End If |
| 6: End While |
| 7: End For |

Suppose a design is to be partitioned into N blocks (sub-circuits). Each sub-circuit has a similar size with the number of gates near the total number of gates of the original design divided by N. Initially, each sub-circuit is empty. An empty sub-circuit is selected and gates are being placed into it. Instead of randomly picking a fan-in cone of an observed point, a fan-in cone with the fewest gates may be chosen as the first to be added into the sub-circuit. This can help achieve balancing by avoiding adding a large cone into a sub-circuit at the first step.

Next, SGR may be used to guide adding additional fan-in cones until the sub-circuit size limit is reached. The gates in the fain-in cone with maximal SGR with the current partition sub-circuit tend to have high probability to lose failing information if they are assigned to a different sub-circuit. If there is no fan-in cone that has any shared gate with the current sub-circuit, an unselected fan-in cone with the least number of gates will be selected, similar to picking the first fan-in cone.

Figure 6:
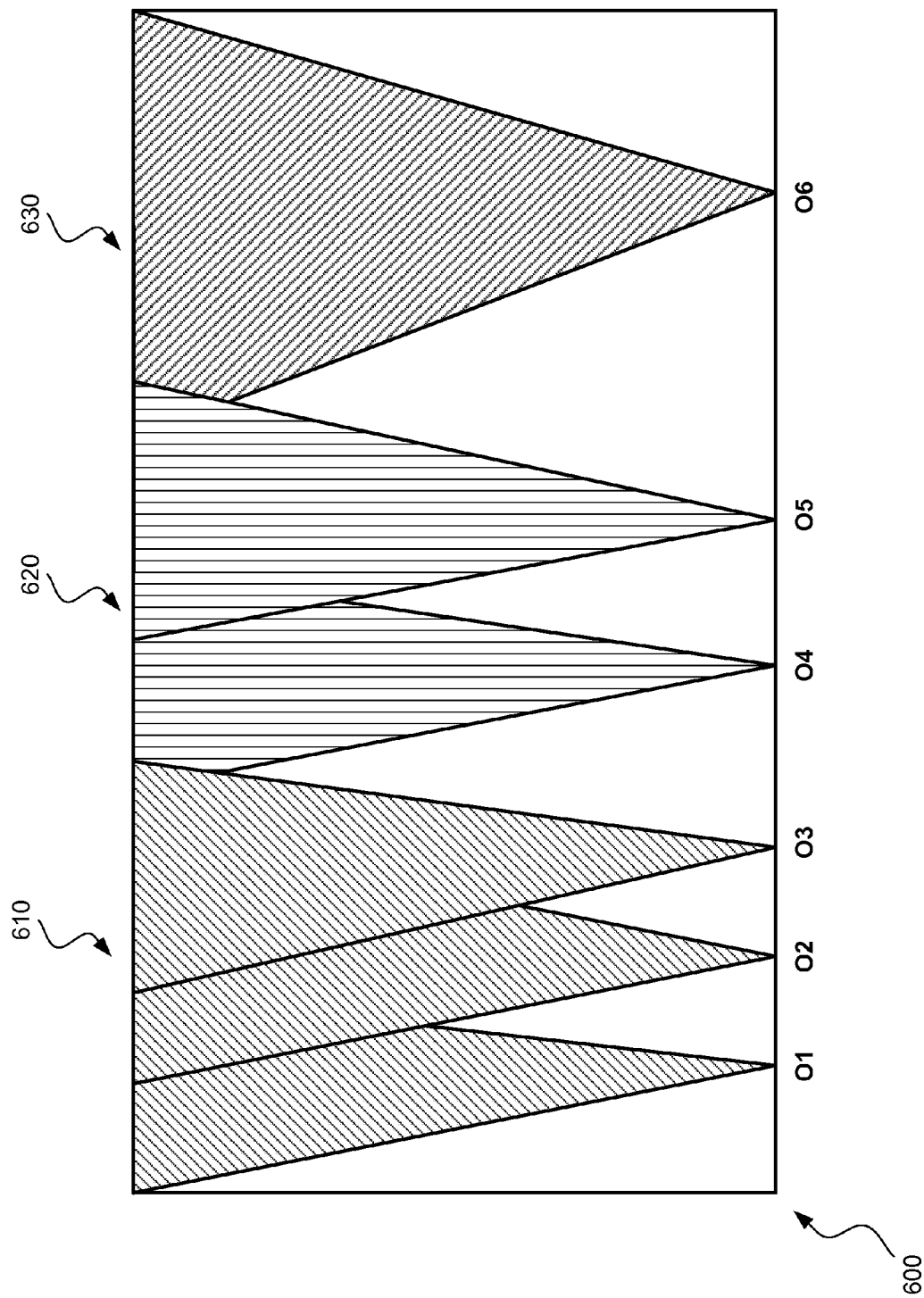
FIG. 6 illustrates an example for applying a partitioning procedure that may be employed by some embodiments of the invention

FIG. 6 illustrates an example for applying the above procedure. The fan-in cone for $O_1$ is selected first to be placed into the first sub-circuit 610 as having the fewest gates. The fan-in cones for $O_2$ and $O_3$ are added consecutively based on the SGR values. Because the sub-circuit size limit is reached (equal to, slightly smaller than or slightly greater than the limit value), the second sub-circuit 620 starts to be filled in. The fan-in cone for $O_4$ now has the fewest gates and thus is chosen as the first. The gates in the intersection between the fan-in cones for $O_3$ and $O_4$ are not in the sub-circuit 620. Then, the fan-in cone for $O_5$ may be placed in the second sub-circuit 620 since the SGR value between the fan-in cones for $O_5$ and $O_4$ is the largest. After the size limit for the sub-circuit 620 is reached, the fan-in cone for $O_6$ is placed in the third sub-circuit 630.

The above procedure tries to place all gates in a fan-in cone of an observation point into a sub-circuit. If a fan-in cone shares gates with cones that are earlier placed in a different sub-circuit, the shared gates are removed from the cone prior to placing it. This may avoids the loopback problem discussed earlier. Without losing generality, assuming that there are two sub-circuits $B_0$ and $B_1$, and two observation points $O_0$ and $O_1$ in these sub-circuits. Suppose $B_0$ is selected first, $O_0$ and $O_1$ are assigned to $B_0$ and $B_1$, respectively. As a result, all of the gates in the fan-in cone of $O_0$ are in block $B_0$, and all the gates shared by the two fan-in cones of the two observation points are assigned to $B_0$. For any gate $g_0$ in $B_0$, it may drive zero or more gates in $B_1$, but there is no path for the driven gate $d_0$ to reach any observation points in $B_0$. Otherwise $d_0$ should be put into $B_0$ instead of $B_1$ based on the assumption that $B_0$ is selected first. For any gate $g_1$ in $B_1$, it cannot drive any gates in $B_0$ because a gate driving $O_0$ will go to $B_0$. Thus, no fault effect of $g_1$ can be propagated to $B_0$. Accordingly, this partitioning procedure can avoid extra failing bits.

Various other partition approaches may be employed. One approach, for example, is based on multilevel hypergraph partitioning described in an article by George Karypis et al., "Multilevel Hypergraph Partitioning: Applications in VLSI Domain," IEEE Transactions On Very Large Scale Integration Systems, Vol. 7, No. 1, 69-79, 1999, which is incorporated herein by reference. Another approach is based on a partition method explained in an article by C. M. Fiduccia et al., "A Linear-Time Heuristic For Improving Network Partitions," 19$^{th}$ Design Automation Conference, Paper 13.1, 1982, which is incorporated herein by reference. Still another approach is based on a heuristic procedure discussed in an article by B. W. Kernighan et al., "An Efficient Heuristic Procedure For Partitioning Graphs," Bell Syst. Tech. J., vol. 49, no. 2, 291-307, 1970, which is incorporated herein by reference.

Once the circuit design is partitioned, the sub-circuit test pattern determination unit 430 determines, in operation 530, sub-circuit test patterns based on the test patterns and the plurality of sub-circuits. During the operation, the test patterns may be mapped to the sub-circuits to determine the sub-circuit test patterns. Bits in each of the test patterns belonging to each sub-circuit in the plurality of sub-circuits are determined. In addition, good machine simulation for the test patterns may be performed to determine fault-free values for boundary gates in the plurality of sub-circuits. The good machine simulation may also be performed during the next fault diagnosis operation.

Next, in operation 540, the sub-circuit fault diagnosis unit 450 performs fault diagnosis on the plurality of sub-circuits based on the sub-circuit test patterns and the failure information to generate sub-circuit diagnosis data. At the beginning of the operation 540, the failure information may be analyzed to extract sub-circuit failure information for the plurality of sub-circuits. Based on the sub-circuit failure information and the sub-circuit test patterns, the sub-circuits that have one or more failing bits may be diagnosed. To diagnose these sub-circuits, the sub-circuit fault diagnosis unit 450 may employ any convention diagnosis tool such as those included in the TESSENT family of software tools available from Mentor Graphics Corporation, Wilsonville, Oreg. The procedure may comprise some or all of the operations shown in FIG. 2. As noted before, fault-free values for boundary gates may be used to help reduce unknown values.

In operation 550, the combination unit 550 generates diagnosis data for the die based on the sub-circuit diagnosis data. Finally, in operation 560, the fault diagnosis tool 400 outputs the diagnosis data. The outputting may comprise storing the diagnosis data in computer memory or storage.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. One or more non-transitory processor-readable storage media storing computer-executable instructions for causing one or more processors to perform a method, the method comprising:
   receiving information of a circuit design for a die, failure information obtained after test patterns are applied to the circuit design, and the test patterns employed to generate the failure information;
   partitioning the circuit design into a plurality of sub-circuits;
   determining sub-circuit test patterns based on the test patterns and the plurality of sub-circuits;
   performing fault diagnosis on the plurality of sub-circuits based on the sub-circuit test patterns and the failure information to generate sub-circuit diagnosis data;
   generating diagnosis data for the die based on the sub-circuit diagnosis data; and
   outputting the diagnosis data.

2. The one or more processor-readable storage media recited in claim 1, wherein the partitioning comprises:
   forming a plurality of sub-circuits based on fan-in cones of observation points.

3. The one or more processor-readable storage media recited in claim 2, wherein the forming comprises:
   determining shared gate ratio values between the fan-in cones; and
   combining fan-in cones based on the shared gate ratio values.

4. The one or more processor-readable storage media recited in claim 2, wherein the forming comprises:
   selecting an unused observation point with a small fan-in cone as an initial fan-in cone to be placed in a sub-circuit.

5. The one or more processor-readable storage media recited in claim 2, wherein the plurality of sub-circuits have a similar size.

6. The one or more processor-readable storage media recited in claim 1, wherein the outputting comprises storing the diagnosis data in computer memory or storage.

7. The one or more processor-readable storage media recited in claim 1, wherein the performing fault diagnosis comprises:
   extracting sub-circuit failure information for the plurality of sub-circuits from the failure information; and
   performing fault diagnosis on sub-circuits that have one or more failing bits based on the sub-circuit failure information and the sub-circuit test patterns.

8. The one or more processor-readable storage media recited in claim 1, wherein the determining comprises:
   mapping the test patterns to the plurality of sub-circuits.

9. The one or more processor-readable storage media recited in claim 8, wherein the determining further comprises:
   performing good machine simulation for the test patterns to determine fault-free values for boundary gates in the plurality of sub-circuits.

10. The one or more processor-readable storage media recited in claim 1, wherein some or all of the plurality of sub-circuits are not disjointed.

11. A method of fault diagnosis, comprising:
    with a computer,
    receiving information of a circuit design for a die, failure information obtained after test patterns are applied to the circuit design, and the test patterns employed to generate the failure information;
    partitioning the circuit design into a plurality of sub-circuits;
    determining sub-circuit test patterns based on the test patterns and the plurality of sub-circuits;

performing fault diagnosis on the plurality of sub-circuits based on the sub-circuit test patterns and the failure information to generate sub-circuit diagnosis data;

generating diagnosis data for the die based on the sub-circuit diagnosis data; and outputting the diagnosis data.

12. The method recited in claim 11, wherein the partitioning comprises:

forming a plurality of sub-circuits based on fan-in cones of observation points.

13. The method recited in claim 12, wherein the forming comprises:

determining shared gate ratio values between the fan-in cones; and combining fan-in cones based on the shared gate ratio values.

14. The method recited in claim 12, wherein the forming comprises:

selecting an unused observation point with a small fan-in cone as an initial fan-in cone to be placed in a sub-circuit.

15. The method recited in claim 12, wherein the plurality of sub-circuits have a similar size.

16. The method recited in claim 11, wherein the performing fault diagnosis comprises:

extracting sub-circuit failure information for the plurality of sub-circuits from the failure information; and performing fault diagnosis on sub-circuits that have one or more failing bits based on the sub-circuit failure information and the sub-circuit test patterns.

17. The method recited in claim 11, wherein the determining comprises:

mapping the test patterns to the plurality of sub-circuits.

18. The method recited in claim 17, wherein the determining further comprises:

performing good machine simulation for the test patterns to determine fault-free values for boundary gates in the plurality of sub-circuits.

19. The method recited in claim 11, wherein some or all of the plurality of sub-circuits are not disjointed.

20. A system comprising one or more processors, the one or more processors programmed to perform a method, the method comprising:

receiving information of a circuit design for a die, failure information obtained after test patterns are applied to the circuit design, and the test patterns employed to generate the failure information;

partitioning the circuit design into a plurality of sub-circuits;

determining sub-circuit test patterns based on the test patterns and the plurality of sub-circuits;

performing fault diagnosis on the plurality of sub-circuits based on the sub-circuit test patterns and the failure information to generate sub-circuit diagnosis data;

generating diagnosis data for the die based on the sub-circuit diagnosis data; and outputting the diagnosis data.

* * * * *